US008931620B2

(12) United States Patent
Eoka

(10) Patent No.: US 8,931,620 B2

(45) Date of Patent: Jan. 13, 2015

(54) MEDIUM DETECTING METHOD, MEDIUM DETECTING DEVICE, MEDIUM DISCHARGE DEVICE AND PRINTING APPARATUS

(75) Inventor: Kenji Eoka, Suntoh-gun (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 1090 days.

(21) Appl. No.: 12/860,378

(22) Filed: Aug. 20, 2010

(65) Prior Publication Data

US 2011/0056799 A1 Mar. 10, 2011

(30) Foreign Application Priority Data

Sep. 8, 2009 (JP) ................................ 2009-207331
Sep. 8, 2009 (JP) ................................ 2009-207332
Sep. 8, 2009 (JP) ................................ 2009-207333
May 14, 2010 (JP) ................................ 2010-112326

(51) Int. Cl.

*B65G 29/00* (2006.01)
*B65H 35/04* (2006.01)
*B65H 29/00* (2006.01)
*G07F 7/08* (2006.01)
*G07F 19/00* (2006.01)
*G07G 5/00* (2006.01)

(52) U.S. Cl.

CPC .............. *B65H 35/04* (2013.01); *B65H 29/008* (2013.01); *G07F 7/0873* (2013.01); *G07F 19/20* (2013.01); *G07F 19/202* (2013.01); *G07G 5/00* (2013.01); *B65H 2301/33312* (2013.01); *B65H 2511/518* (2013.10); *B65H 2513/41* (2013.01); *B65H 2553/412* (2013.01); *B65H 2701/1313* (2013.01); *B65H 2701/1936* (2013.01)

USPC ..................... 198/464.2; 198/347.3; 198/572; 198/575

(58) Field of Classification Search

USPC ............................ 198/464.2, 347.3, 572, 575
See application file for complete search history.

(56) References Cited

U.S. PATENT DOCUMENTS 4,804,175 A * 2/1989 Grandjean .................... 271/225
5,203,554 A * 4/1993 Suzuki et al. .............. 271/10.05
5,879,000 A * 3/1999 Kakuta ........................ 271/3.02
5,908,188 A * 6/1999 Katamoto et al. ........... 271/3.08
5,954,325 A * 9/1999 Nagao .......................... 271/3.05
6,098,978 A * 8/2000 Bielefeld et al. .............. 271/225
6,374,077 B1 * 4/2002 Hirai et al. .................... 399/407

(Continued)

FOREIGN PATENT DOCUMENTS

JP 61-21714 6/1986
JP 62-209691 9/1987

(Continued)

*Primary Examiner* — Joseph Dillon, Jr.

(74) *Attorney, Agent, or Firm* — Amin, Turocy & Watson, LLP

(57) ABSTRACT

According to one embodiment, a medium detecting method includes conveying a medium in a first direction along a first conveying path, and allowing the medium conveyed from the first conveying path to enter a second conveying path arranged with the first conveying path so that the medium is conveyed in a second direction opposite to the first direction. The method also includes allowing light emitting elements of first and second detecting sensors to irradiate light such that the light intersects the first and second conveying paths, and detecting the presence or absence of the medium based on whether or not light receiving elements of the first and second detecting sensors receive the light.

8 Claims, 14 Drawing Sheets

(56) References Cited

U.S. PATENT DOCUMENTS

| | | | | |
|---|---|---|---|---|
| 6,381,442 | B1 * | 4/2002 | Okitsu et al. | 399/405 |
| 6,428,226 | B1 | 8/2002 | Suzuki et al. | |
| 6,674,035 | B2 | 1/2004 | Ito | |
| 2006/0071393 | A1 * | 4/2006 | Mizubata et al. | 271/10.01 |
| 2007/0085258 | A1 * | 4/2007 | Iwago et al. | 271/3.14 |
| 2009/0230615 | A1 * | 9/2009 | Wong et al. | 271/227 |
| 2009/0295067 | A1 * | 12/2009 | Yanagishita | 271/10.12 |
| 2011/0079953 | A1 * | 4/2011 | Ishii et al. | 271/262 |
| 2011/0210503 | A1 * | 9/2011 | Nireki | 271/259 |
| 2011/0248440 | A1 * | 10/2011 | Sugiyama et al. | 271/10.11 |
| 2012/0211935 | A1 * | 8/2012 | Petermann et al. | 271/18 |
| 2013/0181391 | A1 * | 7/2013 | Shiohara | 271/10.01 |

FOREIGN PATENT DOCUMENTS

| | | |
|---|---|---|
| JP | 64-24258 | 1/1989 |
| JP | 11-123850 | 5/1999 |
| JP | 2001-261228 | 9/2001 |

* cited by examiner

MEDIUM DETECTING METHOD, MEDIUM DETECTING DEVICE, MEDIUM DISCHARGE DEVICE AND PRINTING APPARATUS

CROSS-REFERENCE TO RELATED APPLICATIONS

This application is based upon and claims the benefit of priority from Japanese Patent Application No. 2010-112326, filed on May 14, 2010, Japanese Patent Application No. 2009-207331, filed on Sep. 8, 2009, Japanese Patent Application No. 2009-207332, filed on Sep. 8, 2009, and Japanese Patent Application No. 2009-207333, filed on Sep. 8, 2009, the entire contents of which are incorporated herein by reference.

FIELD

The embodiments described herein relate generally to a medium detecting method, a medium detecting device, a medium discharge device, and a printing apparatus, which are employed in detecting a paper being printed and conveyed in a receipt/ticket issuing system using a roll paper.

BACKGROUND

Conventionally, an automatic transaction device such as a cash dispenser or an ATM (automated teller machine), an information terminal device or the like is disposed in an unmanned store. Such a device is equipped with a device for issuing a receipt, a ticket or the like having necessary information printed thereon so as to inform customers of processed contents.

A printing method of the issuing device employs a thermal transfer type, a dot impact type, or the like. The issuing device is designed to dispense a roll paper from a paper roll, print necessary information on the dispensed roll paper, cut the printed portion using a cutting mechanism, and issue it as a receipt or a ticket.

The issuing device is configured to print necessary information on the paper line by line while allowing paper to be conveyed toward a paper discharge outlet. While the paper is being issued, the printed paper is discharged little by little from the paper discharge outlet. Thus, in case a customer grasps the paper while waiting for the issued paper being discharged, the conveyance of paper may be interrupted. In this case, the paper being discharged may be deformed to have a corrugated shape in a rolled state, which causes paper jams.

Also, in case the customer pulls out the paper during the issuance of the paper, printing or cutting errors may occur or a cutting blade of the cutting mechanism may be damaged under certain circumstances. Furthermore, in case the customer does not take the issued paper out of the issuing device, this may hinder subsequent issuance of a paper. In addition, if a third person takes the issued paper, protection of the customer's private information may not be ensured.

A paper discharge device is contemplated in which a printed paper is held until the completion of a printing process or a cutting process, and then the printed paper is discharged after the completion of the printing process or the cutting process.

Such a paper discharge device is provided with a conveying path along which paper is conveyed. A plurality of sensors for detecting a paper jam or paper remainder are disposed along the conveying direction of the paper in the conveying path.

However, when the distance between the respective sensors is larger than the length of the paper being conveyed, if the paper is positioned between two adjacent sensors, the paper may not be detected even though it remains within the paper discharge device.

Accordingly, in some configurations, where a paper has a length shorter than the distance between the sensors, the distance between the sensors is set to be shorter than the length of the paper.

In the meantime, the paper discharge device may adopt a technique in which a front end of the paper being issued is grasped by a pair of discharge rollers to prevent the paper from being discharged from a paper discharge outlet and the paper is kept in a rolled state until the completion of the printing and a cutting process of the paper. Alternatively, the paper discharge device may employ a technique in which a front end of the paper being issued is fed into a switch back unit and is held until the completion of the printing and cutting processes of the paper.

Further, after the paper discharge device discharges the paper through the paper discharge outlet upon the completion of the print and cutting processes of the paper, it may collect the discharged paper in a collecting container when the customer does not take out the paper.

However, in the configuration where the distance between the sensors is set to be shorter than the length of the paper being conveyed, a problem is posed in that a large number of the sensors are required. In addition, in the configuration where a medium having a length shorter than the distance between the sensors is detected for discharge, if the medium is conveyed in a reverse direction based on the fact that a first sensor detects the medium and all of the first sensors and the subsequent sensor(s) do not detect the medium, the presence or absence of the medium is detected by a sensor for detecting the conveyance of the medium in a reverse direction, thereby making it complicated to control the medium conveying system.

In configurations where the paper is kept in a rolled state or in which the paper is fed into a switch back unit for storage, a plurality of conveying roller pairs are disposed along the paper conveying path to convey the paper (while it is being interposed between the conveying roller pairs) into a storage unit. Thus, the arrangement of the conveying roller pairs requires significant space, which results in limiting the space required for the storage unit.

In the above configuration where only a limited space is available for the storage unit, a paper with a large length may not be properly kept in the storage unit. On the other hand, in a configuration where the space of the storage unit is made larger, there is a problem in that the paper discharge device becomes bulky and over-sized.

Moreover, recently, a holding unit is contemplated to hold a long paper in a small space by rolling the paper in a swirl shape.

However, in the configuration where the long paper is held in a rolled state in a swirl shape, there is a problem in that a flapper is separately required to selectively switch the conveying direction of the paper between a temporary holding unit or a collecting container, which leads to an increase in the number of parts.

DETAILED DESCRIPTION

According to one embodiment, a medium detecting method includes conveying a medium in a first direction along a first conveying path, and allowing the medium conveyed from the first conveying path to enter a second conveying path arranged with the first conveying path so that the medium is conveyed in a second direction opposite to the first direction. The method also includes allowing light emitting elements of first and second detecting sensors to irradiate light such that the light intersects the first and second conveying paths, and detecting the presence or absence of the medium based on whether or not light receiving elements of the first and second detecting sensors receive the light.

Figure 1:
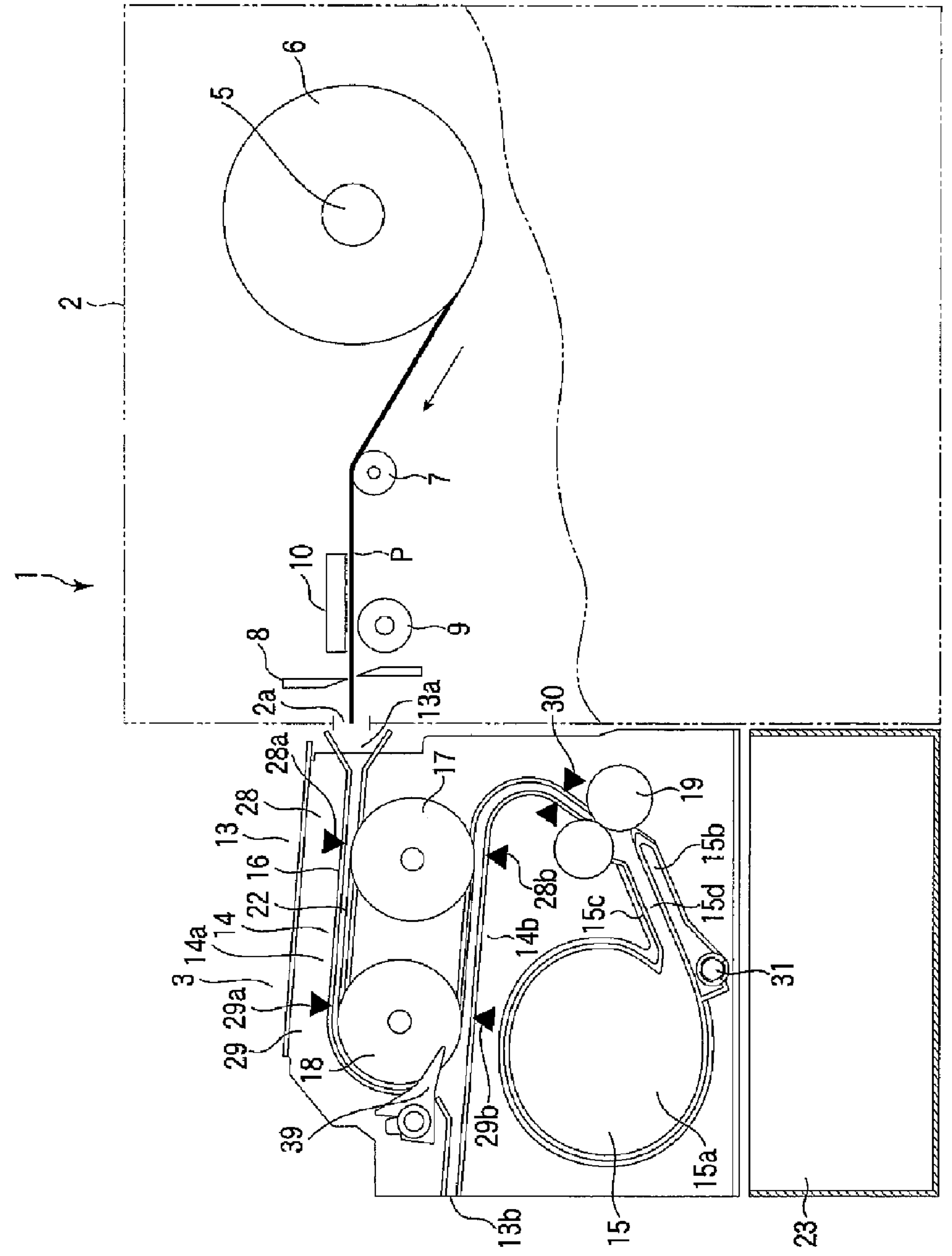
FIG. 1 is a schematic view of a printing apparatus including a paper discharge device according to one embodiment.

FIG. 1 is a schematic view of a printing apparatus 1 according to one embodiment.

The printing apparatus 1 includes a printer body 2 and a roll paper 6 wound around a winding shaft 5 provided within the printer body 2. The roll paper 6 is paid out or delivered at a front end thereof from a paper roll. An idle roller 7, a platen roller 9, and a cutter 8 are arranged in the paid-out direction of the paper. A thermal print head 10 is disposed above the platen roller 9 so as to be opposed to the platen roller 9.

The thermal print head 10 serves to print information line by line on a sheet of paper (medium) P paid out from the roll paper 6. The paper P is pressed against the platen roller 9 by thermal print head 10, and is conveyed by the rotation of the platen roller 9. The printer body 2 has a discharge outlet 2*a* formed at a side thereof so as to allow the paper P to be discharged therethrough.

In the meantime, a paper discharge device 3 is disposed adjacent to the printer body at a paper discharge side of the printer body 2. The paper discharge device 3 serves to temporarily hold and then discharge the paper P discharged from the printer body 2 through the paper discharge outlet 2*a*. Further, the paper discharge device 3 collects the discharged paper P if it is not taken out by a user.

The paper discharge device 3 includes a housing 13. The housing 13 has a paper feed inlet 13*a* formed at a rear side thereof so as to communicate with the paper discharge outlet 2*a* of the printer body 2, and a paper discharge outlet 13*b* formed at a front side thereof. Disposed inside of the housing 13 is a conveying unit 16 for conveying the paper P which has been fed along a conveying path 14 formed in a substantially U-shape.

The conveying path 14 includes an upper conveying path 14*a* as a first conveying path and a lower conveying path 14*b* as a second conveying path provided under and in parallel with the upper conveying path 14*a*. Also, first and second detecting sensors 28 and 29 are disposed at a predetermined interval, i.e., an interval shorter than the minimum length of the paper cut by the cutter 8 in the conveying path 14.

The first and second detecting sensors 28 and 29 includes light emitting elements 28*a* and 29*a*, and light receiving elements 28*b* and 29*b*, respectively. The light emitting elements 28*a* and 29*a* are provided at an upper side of the upper conveying path 14*a*, while the light receiving elements 28*b* and 29*b* are provided at a lower side of the lower conveying path 14*b*. The light emitting elements 28*a* and 29*a* of the first and second detecting sensors 28 and 29 are configured to irradiate light such that the light intersects the upper- and lower-side conveying paths 14*a* and 14*b*. Then, the irradiated light may be received by the light receiving elements 28*b* and 29*b*.

The first and second detecting sensors 28 and 29 detect if a paper is jammed or remains in the conveying path 14 while it is being conveyed. The first detecting sensor 28 is used as an entry sensor that detects the paper P entering the upper conveying path 14*a*, while the second detecting sensor 29 is used as a detecting sensor that detects a rear end of the paper P being conveyed.

In addition, a flapper 39 is disposed adjacent to the paper discharge outlet 13*b* in the conveying path 14. The flapper 39 is elastically biased by a spring member so as to be lifted at its front end. The flapper 39 abuts against a front end of the paper P entered and conveyed through the paper feed inlet 13*a* to cause the flapper 39 to be turned downwardly against an elastic biasing force of the spring member. This causes the flapper 39 to deviate from the conveying path 14, which allows the paper P to pass along the conveying path 14.

The conveying unit 16 includes first and second rollers 17 and 18 spaced apart by a predetermined distance in a horizontal direction, and a conveying roller pair 19. A conveying belt 22 is stretched between the first and second rollers 17 and 18. A capture sensor 30 is disposed at an entry side of the conveying roller pair 19.

Disposed under the conveying unit 16 is a temporary holding unit 15 for temporary holding the paper P being conveyed. Further, disposed under the temporary holding unit 15 is a collecting container 23 for storing the paper P being collected and conveyed back from the paper discharge outlet 13*b*.

The temporary holding unit 15 is supported at a lower side by a support shaft 31, which is in turn freely rotatably mounted to a frame of the housing 13. The temporary holding unit 15 includes a cylindrical storing portion 15*a*, a flapper portion 15*b* formed integrally with a lower side of the receiving portion 15*a*, and a guide piece 15*c* positioned above the flapper portion 15*b* so as to be spaced apart opposed to flapper portion 15*b*. An entry passage 15*d* is formed between the flapper portion 15*b* and the guide piece 15*c* so as to allow the paper P to enter the cylindrical storing portion therethrough.

Figure 2:
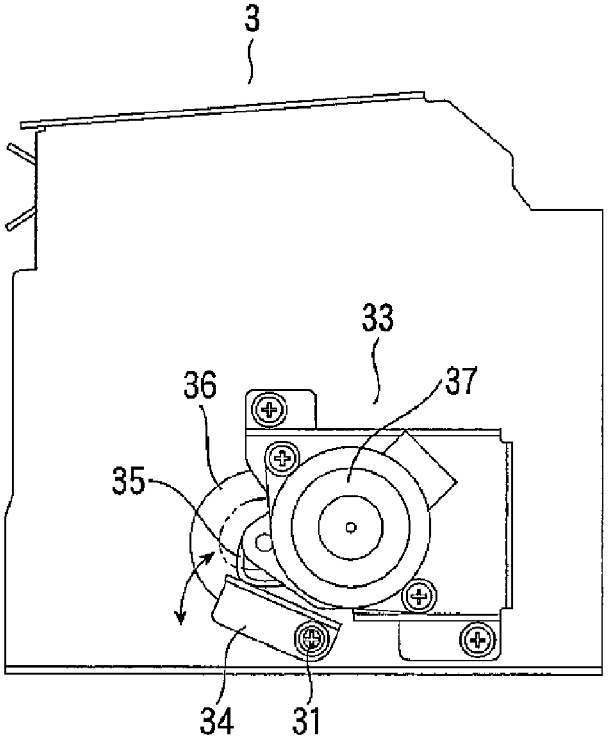
FIG. 2 illustrates a drive mechanism for rotating a temporary holding unit in the paper discharge device.

The temporary holding unit 15 is rotated along the support shaft 31 in forward and reverse directions through a drive mechanism 33 as shown in FIG. 2 to cause the front end of the flapper portion 15*b* to be moved upward or downward. When the front end of the flapper portion 15*b* is moved downward, the paper P is guided toward the temporary holding unit 15.

When the front end of the flapper portion 15*b* is moved upward, the paper P is guided toward the collecting container 23.

The drive mechanism 33 includes a linkage arm 34 with its base end rotatably connected to the support shaft 31. The linkage arm 34 is elastically biased along the support shaft 31 by a spring member (not shown), through which its front end can be lifted. A cam 35 abuts against the front end of the linkage arm 34, and is connected to a cam drive motor 37 via a cam gear 36 and a motor gear (not shown).

The cam 35 is turned by driving the cam drive motor 37 to cause the linkage arm 34 to be turned upward or downward along the support shaft 31. The upward turning of the linkage arm 34 rotates the temporary holding unit 15 in a counter-clockwise direction to cause the front end of the flapper portion 15*b* to be moved upward. On the other hand, the downward turning of the linkage arm 34 rotates the temporary holding unit 15 in a clockwise direction to cause the front end of the flapper portion 15*b* to be moved downward.

Figure 3:
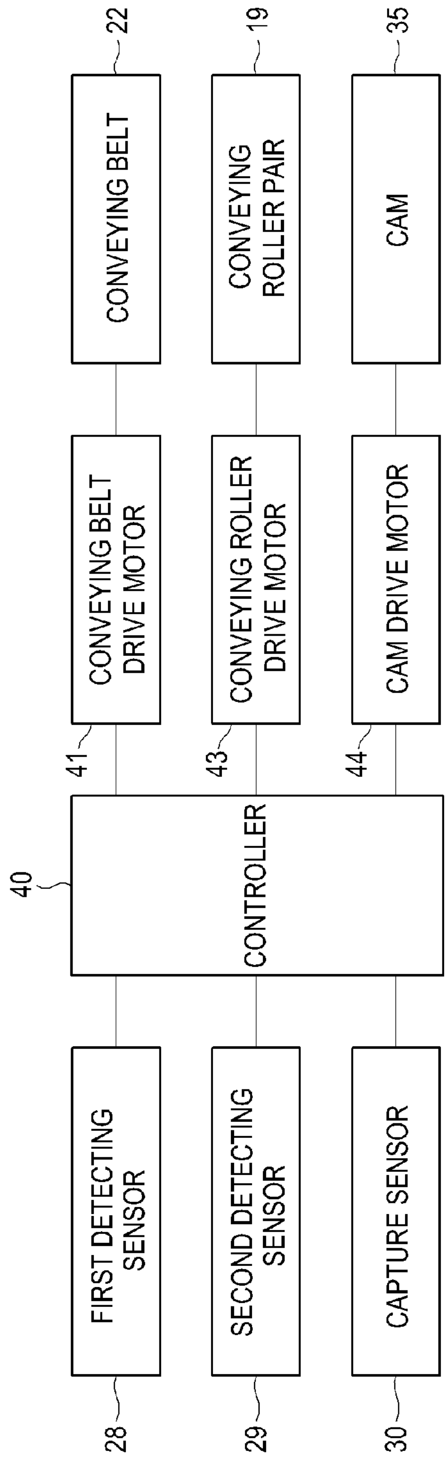
FIG. 3 is a block diagram of a drive control system of the paper discharge device.

FIG. 3 is a block diagram of a drive control system of the temporary holding unit 15 as described above.

The first detecting sensor 28, the second detecting sensor 29 and the capture sensor 30 are connected to a controller 40 via a detection signaling circuit. Connected to the controller 40 are a conveying belt drive motor 41, a conveying roller drive motor 43 and a cam drive motor 44 through a control circuit. The conveying belt drive motor 41 and the conveying roller drive motor 43 are configured to turn in forward and reverse directions.

The controller 40 controls the conveying belt drive motor 41 and the conveying roller drive motor 43 to turn in the forward direction to cause the conveying belt 22 and the conveying roller pair 19 to be turned in the forward direction based on the detection of entry of the paper P by the first detecting sensor 28.

In addition, the controller 40 controls the conveying belt drive motor 41 and the conveying roller drive motor 43 to turn in the reverse direction to cause the conveying belt 22 and the conveying roller pair 19 to be turned in the reverse direction based on the detection of a rear end of the paper P by the second detecting sensor 29.

Moreover, the controller 40 controls the conveying belt drive motor 41 and the conveying roller drive motor 43 to stop movement in the reverse direction based on the detection of the rear end of the paper P fed out by the reverse turning of the conveying belt 22 and the conveying roller pair 19 by the second detecting sensor 29.

Further, the controller 40 controls the conveying belt drive motor 41 and the conveying roller drive motor 43 to turn in the forward direction to cause the conveying belt 22 and the conveying roller pair 19 to be turned in the forward direction when a user forgets to take the discharged paper P and the discharged paper P is left without being withdrawn for a predetermined period of time.

Furthermore, the controller 40 controls the cam drive motor 44 to turn to cause the temporary holding unit 15 to rotate in the counterclockwise direction based on the detection of a front end of the paper P in its entering direction by the capture sensor 30. Consequently, the flapper portion 15*b* of the temporary holding unit 15 is lifted, and the conveying direction of the paper P fed out from the conveying roller pair 19 is switched to the collecting container 23.

In the meantime, the controller 40 determines that the paper P is jammed or remains in the conveying path 14 if light emitted from the light emitting elements 28*a* and 29*a* of the first and second detecting sensors 28 and 29 has not been received by the light receiving elements 28*b* and 29*b* for more than a predetermined period of time.

Next, the discharge operation of the paper P will be described hereinafter with reference to FIGS. 4 to 7.

Figure 4:
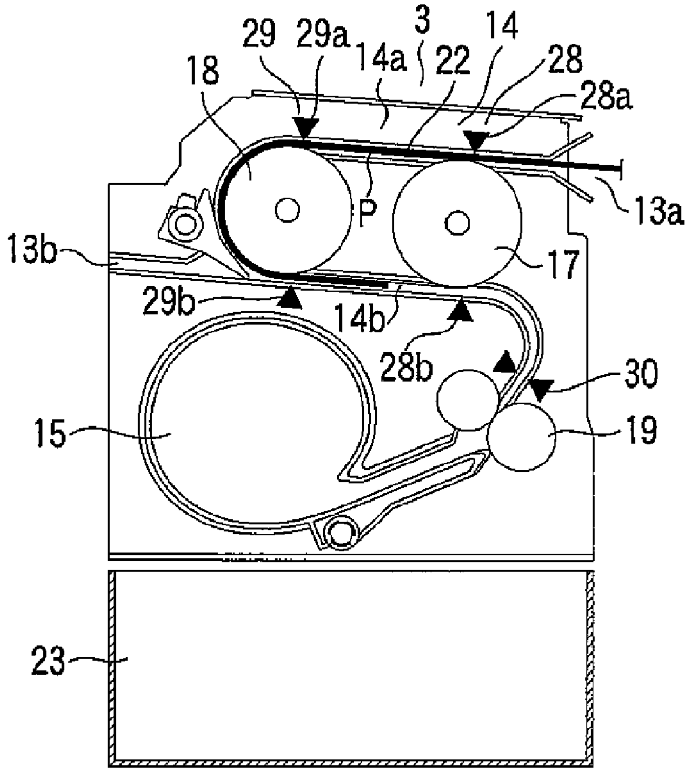
FIG. 4 is a schematic view of the paper discharge device in a state in which paper is being conveyed.
Figure 5:
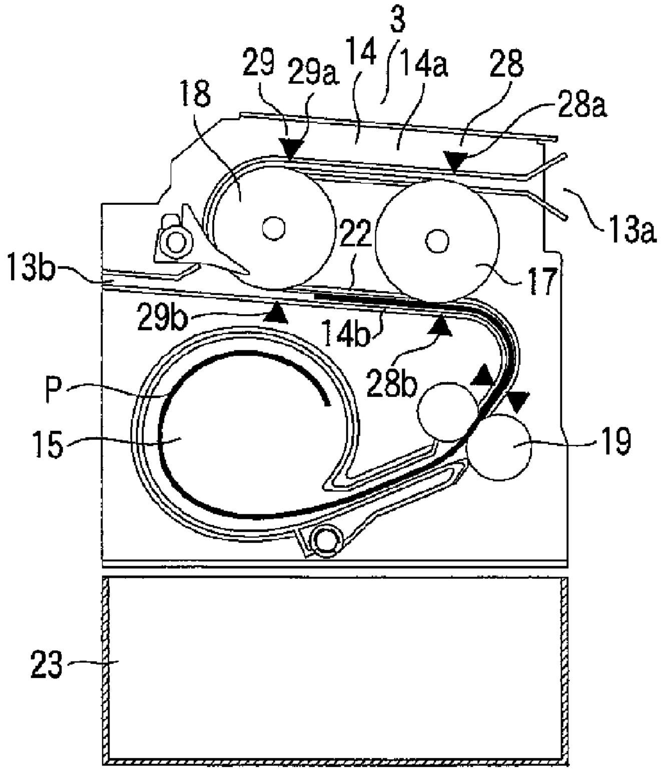
FIG. 5 is a schematic view of the paper discharge device in a state in which paper being conveyed is held in the temporary holding unit.

The paper P printed in the printing apparatus 1 is discharged through the paper discharge outlet 2*a*, and then enters the paper discharge device 3 through the paper feed inlet 13*a*, as shown in FIG. 4. The entering paper P is detected by the first detecting sensor 28. The conveying belt drive motor 41 is turned in the forward direction based on the detection of the entering paper P to cause the conveying belt 22 to be turned in a forward direction. The turning of the conveying belt 22 allows the paper P to be conveyed along the U-shaped conveying path 14. Then, the paper P is fed out from the conveying belt 22 and enters the conveying roller pair 19 as shown in FIG. 5. Subsequently, the paper P is conveyed while it is interposed between the conveying roller pair 19 by the forward turning of the conveying roller pair 19. Thus, the paper P is fed out from the conveying roller pair 19 and enters the temporary holding unit 15, so that it is held in a rolled state within the temporary holding unit 15.

Figure 6:
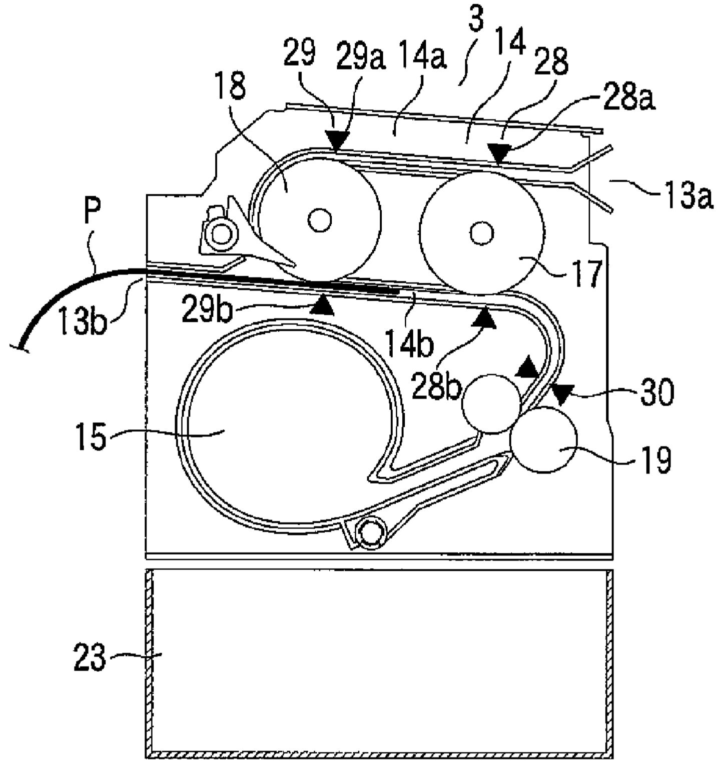
FIG. 6 is a schematic view of the paper discharge device in a state in which the temporarily held paper is discharged.

When a rear end of the paper P in its conveyed direction held within the temporary holding unit 15 is detected by the second detecting sensor 29, the conveying belt 22 and the conveying roller pair 19 turn in a reverse direction to cause the paper P to be conveyed reversely. The reversely conveyed paper P is discharged from the paper discharge outlet 13*b* as shown in FIG. 6. In this case, when a rear end of the paper P in its reverse-conveyed direction is detected by the second detecting sensor 29, its reverse conveyance stops.

Figure 7:
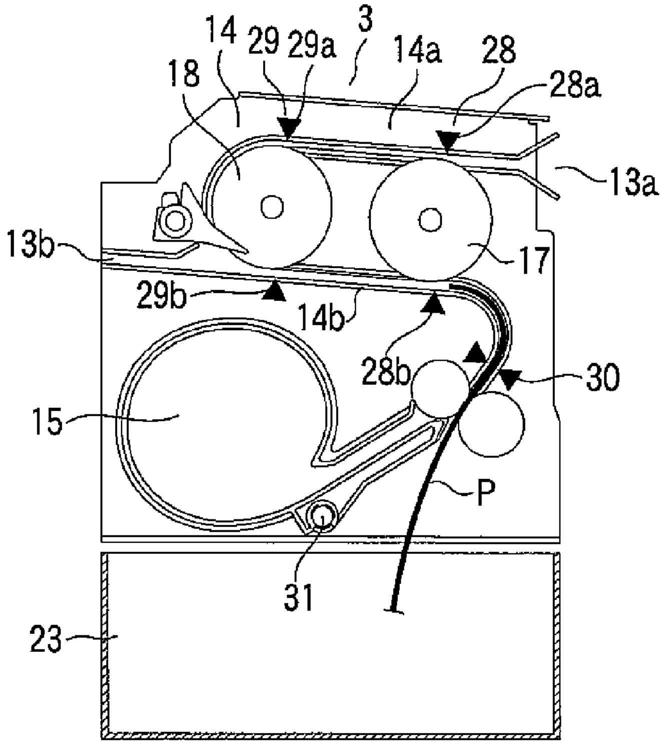
FIG. 7 is a schematic view of the paper discharge device in a state in which the discharged paper is collected when it is not taken out.

When the paper P discharged from the paper discharge outlet 13*b* is left without being taken out by a user for a predetermined period of time, the conveying belt drive motor 41 and the conveying roller drive motor 43 turn in the forward direction to cause the conveying belt 22 and the conveying roller pair 19 to be turned in the forward direction. This forward turning of the conveying belt 22 and the conveying roller pair 19 allows the paper P to enter the paper discharge device. When a front end of the entered paper P in its conveyed direction is detected by the capture sensor 30, the temporary holding unit 15 rotates along the support shaft 31 in the counterclockwise direction to cause the flapper 15*b* to be lifted as shown in FIG. 7. As a result, the conveying direction of the entering paper P is switched to the collecting container 23 and the paper P is collected therein.

During the paper discharge operation as described above, if light emitted from the light emitting elements 28*a* and 29*a* of the first and second detecting sensors 28 and 29 is not received by the light receiving elements 28*b* and 29*b* for more than a predetermined period of time, it is determined that the paper P is jammed in the upper conveying path 14*a* or the lower conveying path 14*b*. Also, upon the completion of the paper discharge operation, if light emitted from the light emitting elements 28*a* and 29*a* of the first and second detecting sensors 28 and 29 is not received by the light receiving elements 28*b* and 29*b* for more than a predetermined period of time, it is determined that the paper P remains in the upper conveying path 14*a* or the lower conveying path 14*b*.

As described above, according to the present embodiment, the light emitting elements 28*a* and 29*a* are provided at the upper side of the upper conveying path 14*a*, while the light receiving elements 28*b* and 29*b* are provided at the lower side of the lower conveying path 14*b*. Also, the light emitting elements 28*a* and 29*a* irradiate light such that the light intersects the upper and lower conveying paths 14*a* and 14*b*, and the presence or absence of the paper P is detected based on whether or not the light is received by the receiving elements

28*b* and 29*b*. In this configuration, one detecting sensor 28 (or detecting sensor 29) can detect the paper conveyed along the upper conveying path 14*a* as well as the paper conveyed from the upper conveying path 14*a* to the lower conveying path 14*b*.

Therefore, it is possible to reduce the number of detecting sensors as compared to the conventional configuration where detecting sensors respectively including light emitting/receiving elements are provided separately at the upper conveying path 14*a* and the lower conveying path 14*b*. Further, the paper P can be detected without involving a complicated control of the paper conveying system.

Furthermore, according to the present embodiment, the flapper portion 15*b* is formed integrally with the temporary holding unit 15 so as to selectively switch the conveying direction of the paper P to either the temporary holding unit 15 or the collecting container 23, thereby leading to a reduction in the number of parts and a simpler configuration of the printing apparatus.

Figure 8:
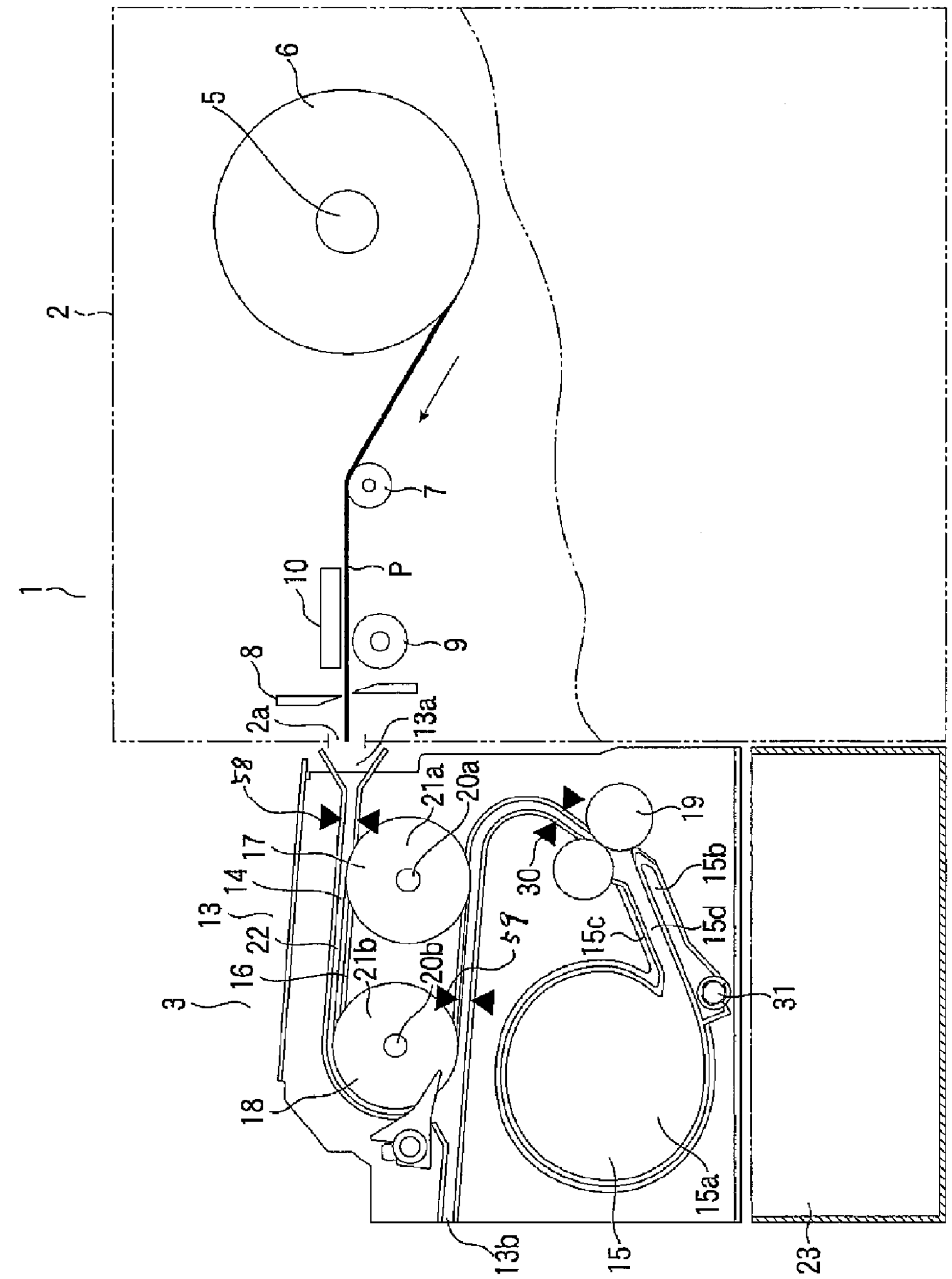
FIG. 8 is a schematic view of a printing apparatus including a paper discharge device according to one embodiment.

FIG. 8 is a schematic view of a printing apparatus 1 according to another embodiment.

In the ensuing discussion, the same elements as those descried in the above embodiment are designated by the same reference numerals, and thus the description thereof will be omitted.

A paper entry sensor 58 is disposed in proximity to the paper feed inlet 13*a* in the conveying path 14 within the paper discharge device 3. Further, a paper rear-end detecting sensor 59 is disposed at an approximately central portion of a lower side of the conveying path 14

Figure 9:
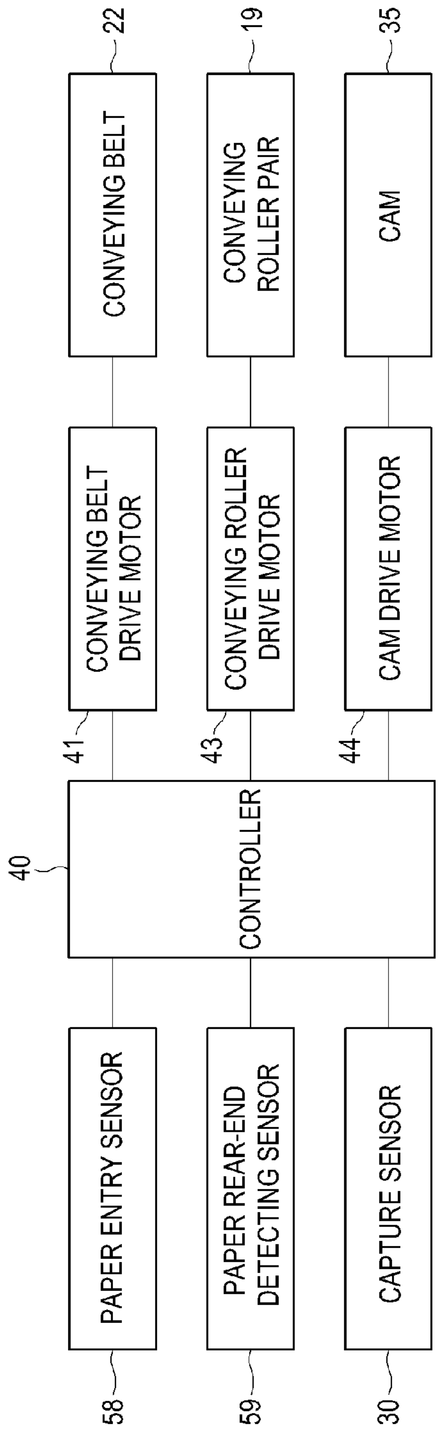
FIG. 9 is a block diagram of a drive control system of the paper discharge device.

The paper entry sensor 58 and the paper rear-end detecting sensor 59 are connected to a controller 40 via a detection signaling circuit as shown in FIG. 9.

The conveying unit 16 in the paper discharge device 3 includes first and second roller units 17 and 18 spaced by a predetermined distance in a horizontal direction, and a conveying roller pair 19.

Figure 10:
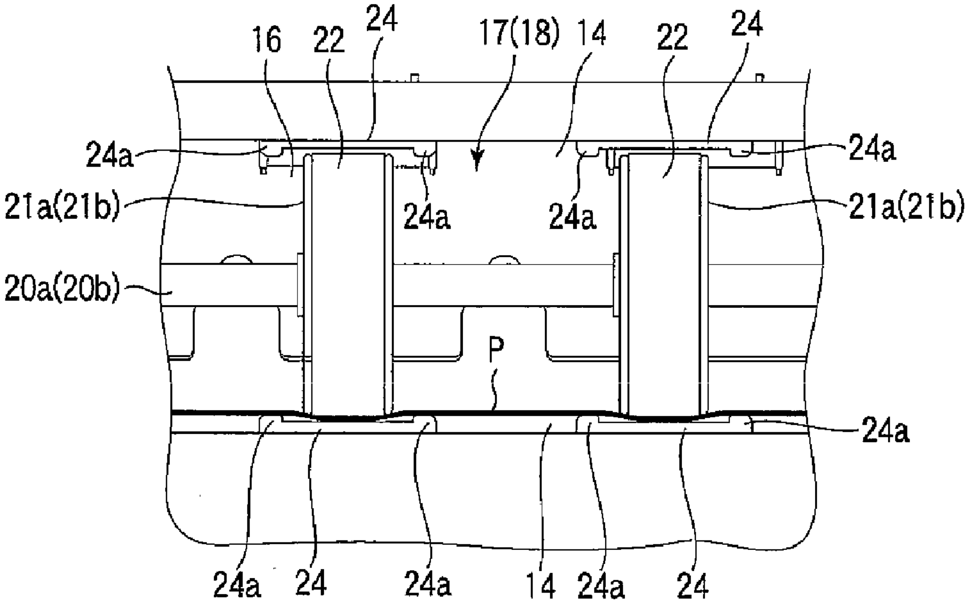
FIG. 10 is a schematic view of a paper conveying mechanism in the paper discharge device.

As shown in FIG. 10, the first and second roller units 17 and 18 include first and second shafts 20*a* and 20*b*, respectively, arranged in the direction orthogonal to the conveying direction of the paper P. A pair of first rollers 21*a* is disposed along the first shaft 20*a* while a pair of second rollers 21 *b* is disposed along the second shaft 20*b*, so that the respective pairs of rollers are spaced apart from each other by a predetermined distance. Further, conveying belts 22 are respectively stretched between the first and second rollers 21*a* and 21*b*.

In addition, tension plates 24 are arranged along the conveying surfaces of the upper and lower portions of the respective conveying belts 22. Each of the tension plates 24 is formed in a concave shape in cross-section, and has ribs 24*a* that protrude from both sides thereof. The respective conveying belts 22 are positioned between the two ribs 24*a*. The paper P is bent and interposed between the conveying surfaces of the conveying belts 22 and the ribs 24*a* while it is conveyed in a state of being in pressure contact with the conveying surfaces of the conveying belts 22.

Moreover, an empty space is defined between the conveying surfaces of the conveying belts 22 and the surfaces of the tension plates 24 facing the conveying surfaces so that the conveying belt 22 and the tension plate 24 are kept in a non-contact state. Thus, abrasion of the conveying belts 22 can be reduced.

Next, the discharge operation of the paper P will be described hereinafter with reference to FIGS. 10 to 14.

Figure 11:
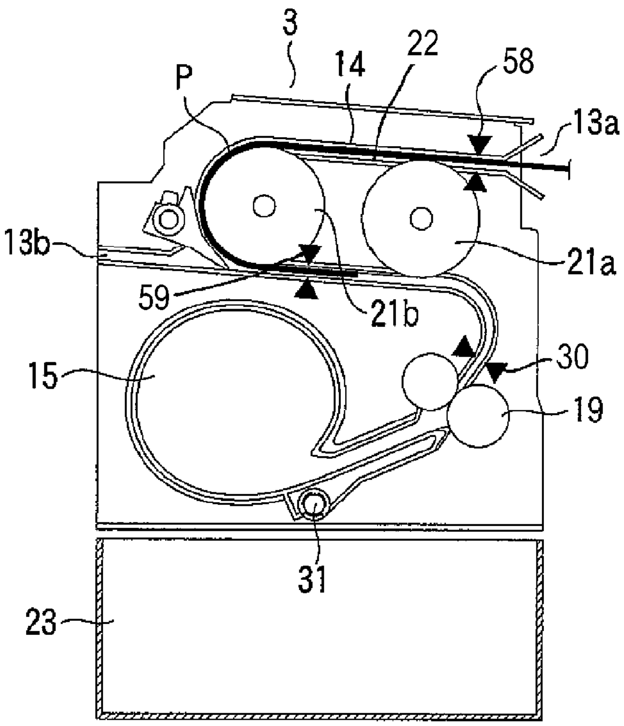
FIG. 11 is a schematic view of the paper discharge device in a state in which paper is being conveyed.
Figure 12:
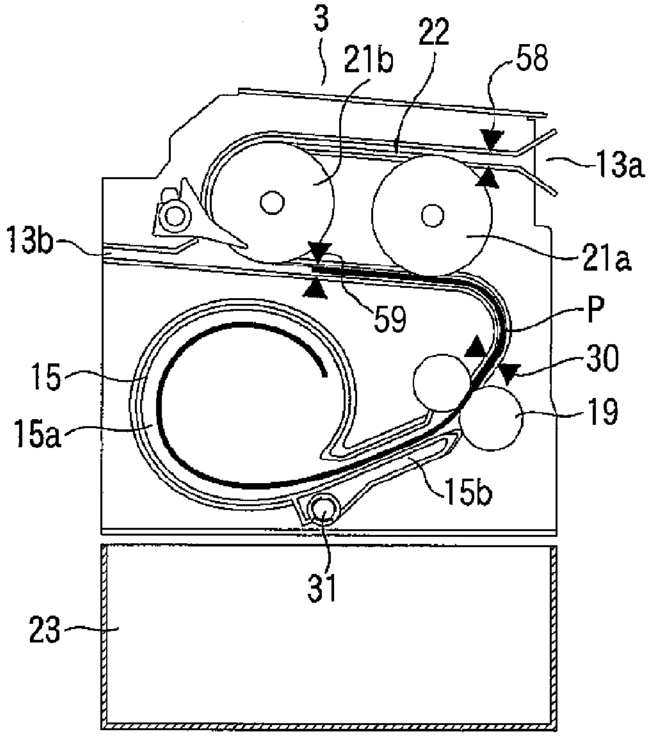
FIG. 12 is a schematic view of the paper discharge device in a state in which paper being conveyed is held in the temporary holding unit.
Figure 13:
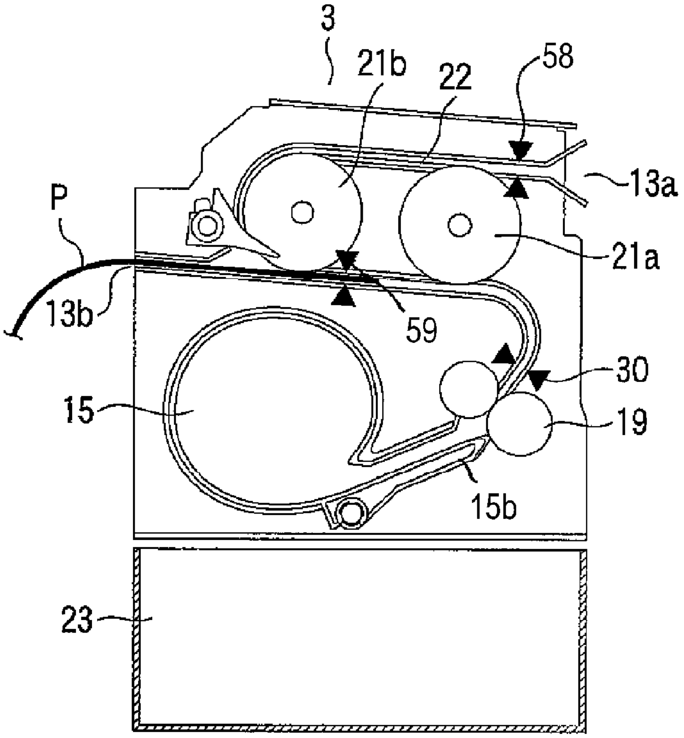
FIG. 13 is a schematic view of the paper discharge device in a state in which the temporarily held paper is discharged.

The paper P printed in the printing apparatus 1 is discharged through the paper discharge outlet 2*a*, and then enters the paper feed inlet 13*a* of the paper discharge device 3 as shown FIG. 11. The entering paper P is detected by the paper entry sensor 58. The conveying belt drive motor 41 is turned in the forward direction to cause the conveying belt 22 to be turned forward based on the detection of the entering paper P. Thus, as shown in FIG. 10, the paper P is bent and interposed between the conveying surfaces of the conveying belts 22 and the ribs 24*a* while it is conveyed along the U-shaped conveying path 14 in a state of being in pressure contact with the conveying surfaces of the conveying belts 22. Then, as shown in FIG. 12, the paper P is fed out from the conveying belts 22 and enters the conveying roller pair 19. Subsequently, the entering paper P is conveyed while it is interposed between the conveying roller pair 19 by the forward turning of the conveying roller pair 19. Thus, the paper P is fed out from the conveying roller pair 19 and enters the temporary holding unit 15 so that it is held in a rolled state within the temporary holding unit 15. When a rear end of the paper P in its conveyed direction held within the temporary holding unit 15 is detected by the paper rear end detecting sensor 59, the conveying belts 22 and the conveying roller pair 19 turn in a reverse direction to cause the paper P to be conveyed reversely. The reverse-conveyed paper P is discharged from the paper discharge outlet 13*b* as shown in FIG. 13. In this case, when a rear end of the paper P in its reverse-conveyed direction is detected by the second detecting sensor 59, its reverse conveyance stops.

Figure 14:
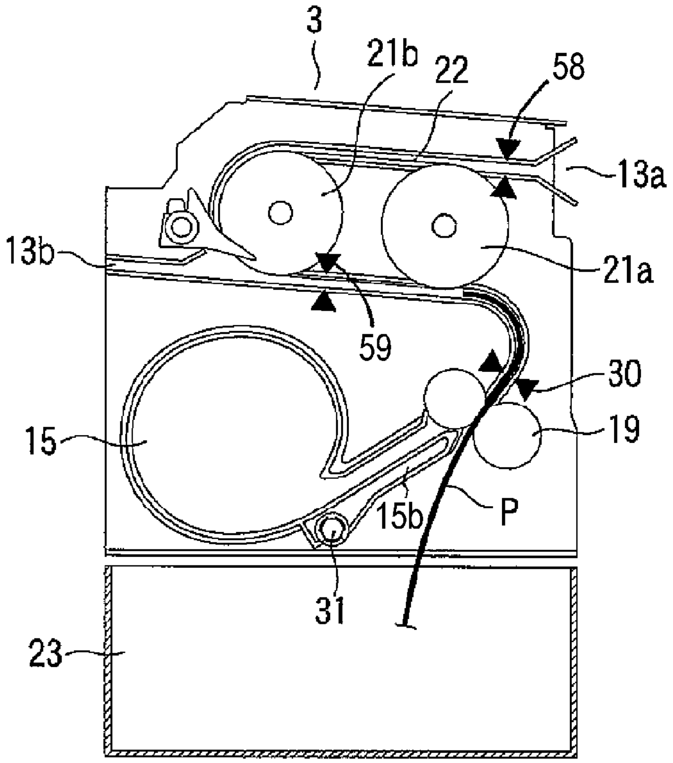
FIG. 14 is a schematic view of the paper discharge device in a state in which the discharged paper is collected when it is not taken out.

When the paper P discharged from the paper discharge outlet 13*b* is left without being taken out by a user for a predetermined period of time, the conveying belt drive motor 41 and the conveying roller drive motor 43 are turned in the forward direction to cause the conveying belts 22 and the conveying roller pair 19 to be turned in the forward direction. It allows the paper P to enter the inside of the paper discharge device 3. When the entering paper P is detected at its front end in the entering direction by the capture sensor 30, the temporary holding unit 15 rotates along the support shaft 31 in the counterclockwise direction to cause the flapper 15*b* to be lifted as shown in FIG. 14. As a result, the conveying direction of the entering paper P is switched to the collecting container 23 and the paper P is collected therein.

As described above, according to the present embodiment, the conveying unit 16 includes a pair of rollers 21*a* and 21*b* spaced apart from each other by a predetermined distance, a conveying belt 22 stretched between the rollers 21*a* and 21*b*, and a tension plate 24 arranged along the conveying surface of the conveying belt 22. In this configuration, the paper P is conveyed by a frictional force produced by interposing the paper P between the conveying surface of the conveying belt 22 and the tension plate 24. Thus, the configuration of the paper discharge device can be further simplified as compared to the configuration where the paper P is conveyed by a plurality of conveying roller pairs. Accordingly, the space required for arranging the conveying unit 16 can be reduced. Further, as the space for arranging the conveying unit 16 is reduced, the space required for the temporary holding unit 15 can be increased without requiring a bulky and lager size paper discharge device, which also makes it possible to temporarily hold a longer piece of paper.

In addition, according to the present embodiment, the flapper portion 15*b* is formed integrally with the temporary holding unit 15 so as to selectively switch the conveying direction of the paper P to either the temporary holding unit 15 or the collecting container 23, thereby leading to a reduction in the number of parts and a simpler configuration of the printing apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medium detecting device comprising:

a first conveying path configured to convey a medium in a first direction;

a second conveying path configured to convey the medium from the first conveying path to the second conveying path so that the medium is conveyed in a second direction opposite to the first direction;

first and second detecting sensors comprising a light emitting element and a light receiving element; and a temporary holding unit configured to receive the medium conveyed from the second conveying path until a rear end of the medium being conveyed in a conveyed direction is detected by the second detecting sensor, the temporary holding unit having a cylindrical shape and the medium being held in a rolled state within the temporary holding unit, wherein the light emitting elements of the first and second detecting sensors irradiate light such that the light intersects the first and second conveying paths, and the presence or absence of the medium is detected based on whether or not the light receiving elements of the first and second detecting sensors receive the light.

2. The medium detecting device recited in claim 1, wherein the second conveying path is parallel to the first conveying path.

3. The medium detecting device recited in claim 1, wherein the distance between each of the first detecting sensors is shorter than the length of the medium.

4. The medium detecting device recited in claim 1, wherein the distance between each of the second detecting sensors is shorter than the length of the medium.

5. A medium detecting device comprising:

a first conveying path configured to convey a medium in a first direction;

a second conveying path configured to allow the medium conveyed from the first conveying path to enter the second conveying path so that the medium is conveyed in a second direction at least opposite to the first direction;

first and second detecting sensors comprising a light emitting element and a light receiving element;

a temporary holding unit configured to receive the medium conveyed from the second conveying path until a rear end of the medium being conveyed in a conveyed direction is detected by the second detecting sensor, the temporary holding unit having a cylindrical shape and the medium being held in a rolled state within the temporary holding unit; and a controller configured to control the medium held temporarily in the temporary holding unit to be conveyed in a reverse direction through the second conveying path, wherein the light emitting elements of the first and second detecting sensors irradiate light such that the light intersects the first and second conveying paths, and the presence or absence of the medium is detected based on whether or not the light receiving elements of the first and second detecting sensors receive the light.

6. The medium detecting device recited in claim 5, wherein the second conveying path is parallel to the first conveying path.

7. The medium detecting device recited in claim 5, wherein the distance between each of the first detecting sensors is shorter than the length of the medium.

8. The medium detecting device recited in claim 5, wherein the distance between each of the second detecting sensors is shorter than the length of the medium.

* * * * *